Aug. 8, 1950  H. A. CLARKE  2,517,976
DETONATION INDICATING APPARATUS
Filed April 11, 1946  4 Sheets—Sheet 1
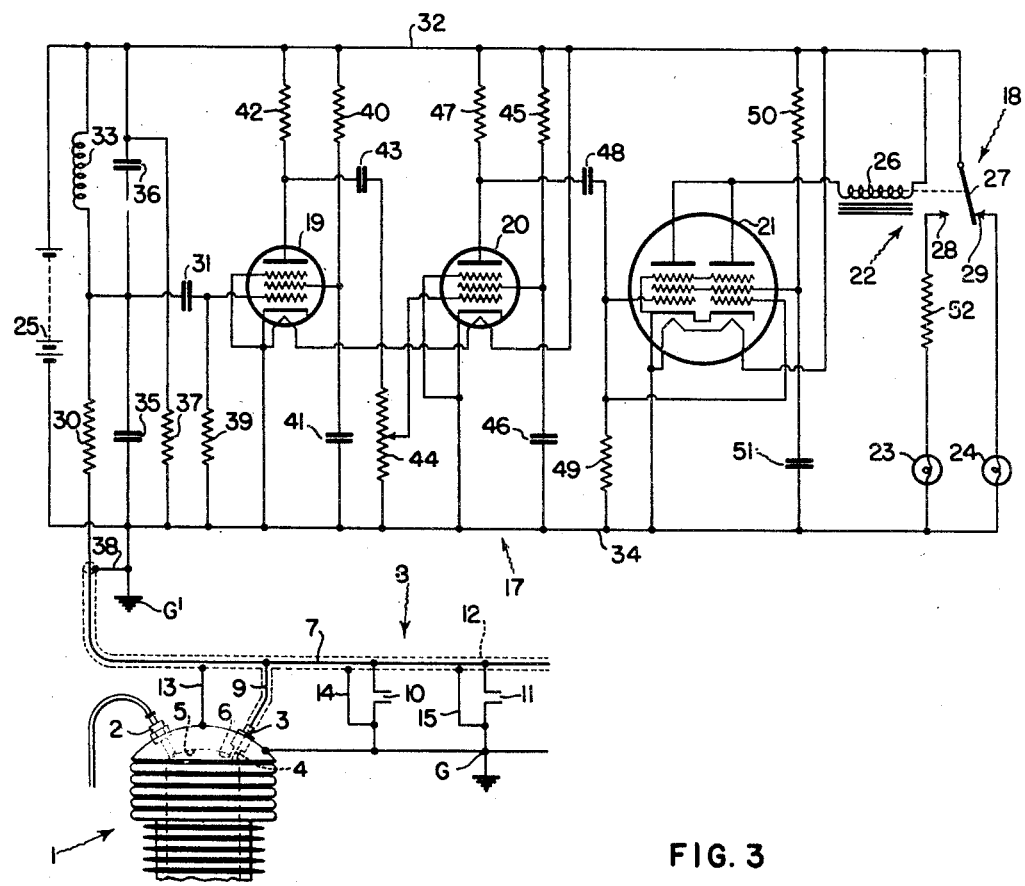
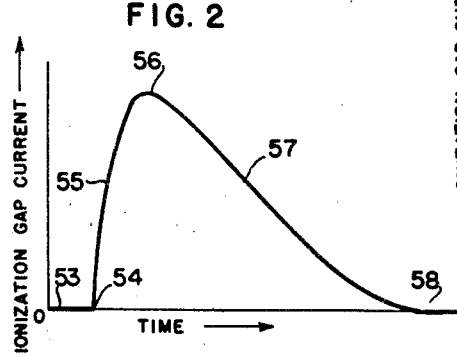
FIG. 2
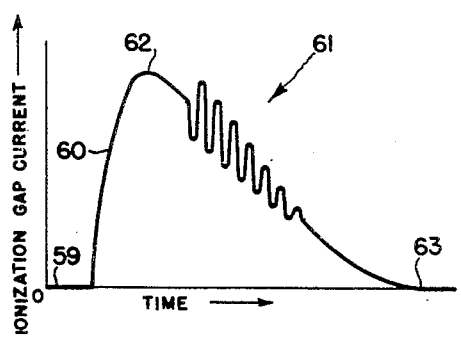
FIG. 3
*INVENTOR.*
HERBERT A. CLARKE
BY
Arthur H. Swanson
ATTORNEY.

Aug. 8, 1950 H. A. CLARKE 2,517,976
DETONATION INDICATING APPARATUS
Filed April 11, 1946 4 Sheets-Sheet 2
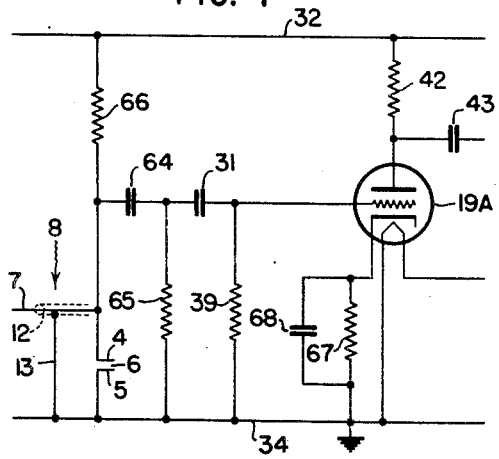
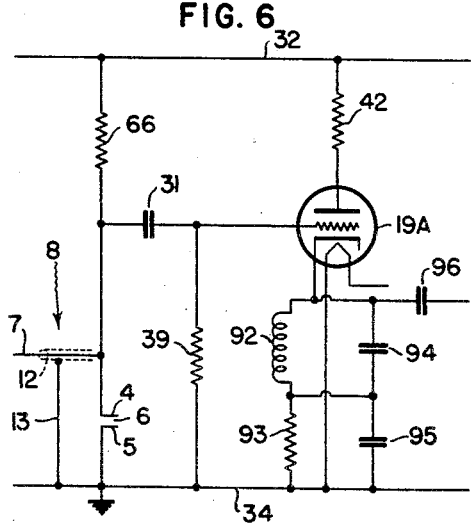
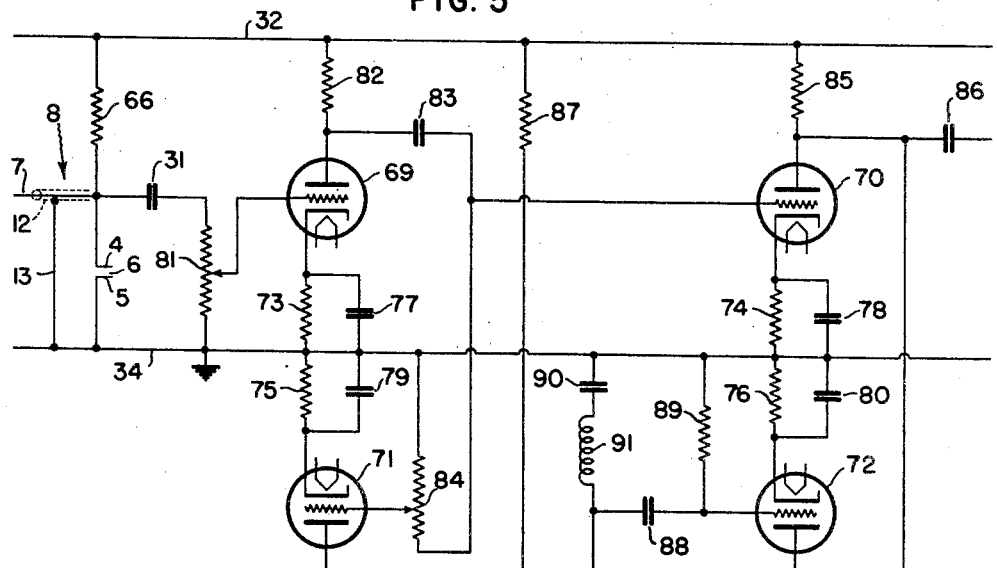
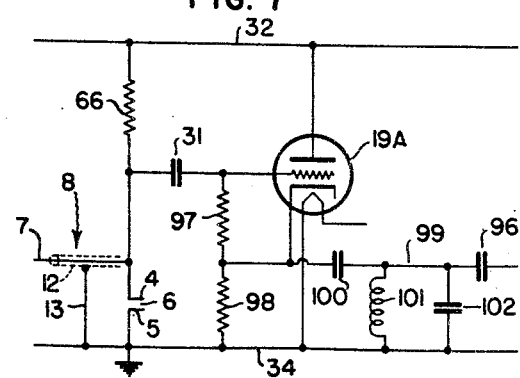
*INVENTOR.*
HERBERT A. CLARKE
BY
*Arthur H. Swanson*
ATTORNEY.

Aug. 8, 1950          H. A. CLARKE          2,517,976
DETONATION INDICATING APPARATUS
Filed April 11, 1946          4 Sheets-Sheet 3
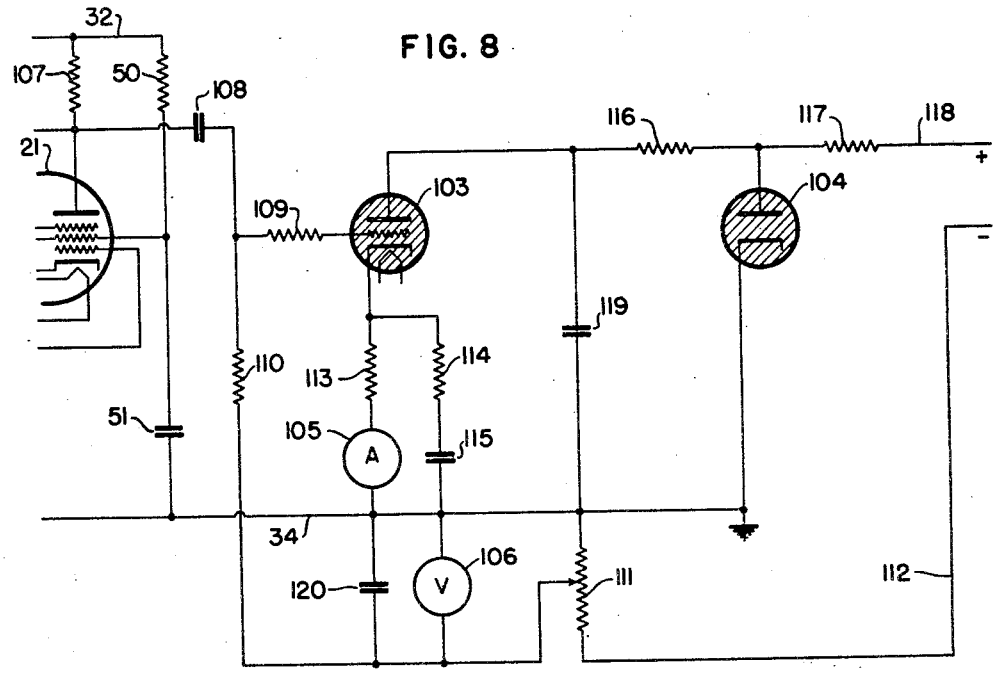
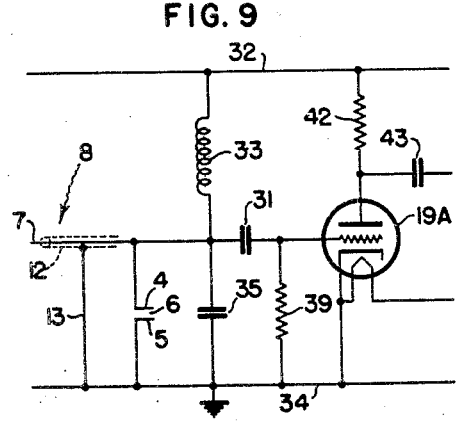
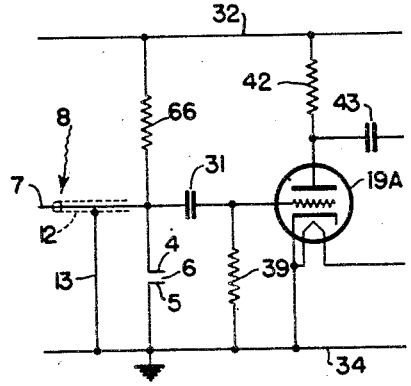
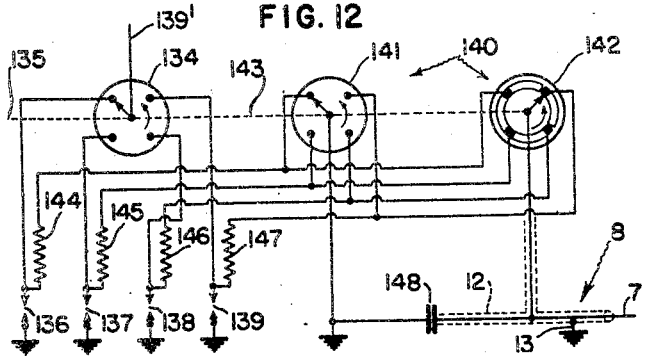
*INVENTOR.*
HERBERT A. CLARK
BY *Arthur H. Swanson*
ATTORNEY.

Aug. 8, 1950  H. A. CLARKE  2,517,976
DETONATION INDICATING APPARATUS
Filed April 11, 1946  4 Sheets-Sheet 4

INVENTOR.
HERBERT A. CLARKE
BY Arthur H. Swanson
ATTORNEY.

Patented Aug. 8, 1950

2,517,976

UNITED STATES PATENT OFFICE 2,517,976

DETONATION INDICATING APPARATUS

Herbert A. Clarke, Merion, Pa., assignor, by mesne assignments, to Minneapolis-Honeywell Regulator Company, Minneapolis, Minn., a corporation of Delaware Application April 11, 1946, Serial No. 661,201

18 Claims. (Cl. 177—311)

This invention relates to an apparatus for detecting changes in the ionization of a gas contained in a chamber, and more particularly relates to improved apparatus for detecting the occurrence of detonation in the cylinders of internal combustion engines.

An object of the present invention is to provide an improved apparatus for the detection of changes occurring in the ionization of a gas contained in a chamber.

A more specific object of the present invention is to provide an improved apparatus for the detection of the fluctuations in ionization of the burning gases in the cylinders of internal combustion engines which take place upon the occurrence of detonation within such engines.

Another object of the present invention is to provide an improved apparatus which will cause a positive indication to be given upon the occurrence of detonation within the internal combustion engine to which the apparatus is operatively connected.

Still another object of the present invention is to provide an improved apparatus which will cause a positive indication to be given when the degree of detonation in an interal combustion engine rises above a predetermined value.

A further object of the present invention is to provide an improved apparatus for automatically controlling the amount of fuel supplied to an internal combustion engine so that a minimum of fuel will be consumed by the engine over its entire operating range.

A still further object of the present invention is to provide apparatus for detonation detection which is especially suitable for use with the multi-cylinder engines used in aircraft, is operative to provide a positive indication of the occurrence of detonation in any one or all of the cylinders of the engine, and may be utilized to control automatically the fuel supply mixture as required to effect operation of the engine at the highest possible efficiency under all normal conditions without the occurrence of detonation.

Another object of the present invention is to provide a detonation detection system which is operable directly from the 24 volt direct current supply in an airplane, thus making unnecessary the need for additional power supplies, and hence providing a substantially light weight unit.

Another object of the present invention is to provide a detonation detection apparatus which utilizes the spark plugs of an internal combustion engine as the detonation detecting devices.

Still another object of the present invention is to provide a means for detecting the occurrence of detonation in the cylinders of a multicylinder internal combustion engine whereby the operating condition within each of the cylinders can be determined separately.

Still another object of the present invention is to provide a detonation detector which will indicate the frequency of occurrence of detonation in an engine.

In a spark ignited internal combustion engine, secondary explosions, commonly termed detonation, of the burning gases within the cylinders occur if the fuel-to-air ratio of the combustible mixture supplied to the cylinders is below a certain value. This value varies with such factors as load, speed, kind and type of fuel, etc. Since detonation usually results in damage to the engines in which it occurs, it is extremely desirable to prevent its occurrence. It is undesirable from the standpoint of efficiency, however, to operate an engine with a richness of mixture greater than that necessary just to prevent the occurrence of detonation.

For stationary internal combustion engines, detonation can usually be detected aurally, and the fuel-to-air ratio of the combustible mixture can be reduced manually until the first "pings" or "knocks" which accompany detonation are heard.

In the case of aircraft engines, however, other existing noises make it impossible to detect aurally the sounds accompanying detonation. Therefore, to preclude the occurrence of detonation and its undesirable results, it has been found expedient heretofore to maintain the fuel-to-air ratio of the combustible mixture supplied to the cylinders at a higher value than that necessary just to prevent the occurrence of detonation. This naturally results in an undesirable waste of fuel, which not only limits the efficiency of the engine, but also limits the striking or cruising range of the aircraft for a given fuel capacity. By the use of the present invention, however, either manual or automatic control of the richness of mixture can be had, with the result that an absolute minimum rate of fuel consumption under all flight conditions can be realized. This results in an increase in the efficiency of operation of the engine, precludes the danger of detonation, and increases the flying range of the aircraft for a given capacity of fuel.

There have been proposed in the prior art several methods of and devices for the detection of detonation in internal combustion engines. These include pressure sensitive devices, vibration pick-up devices, devices using a bouncing pin, etc. These types of detectors are often seriously affected in their operation by extraneous vibrations, such as the closing of the engine valves, and the pressure indicator type is further affected by the corrosive action of the cylinder gases with which the pressure detecting unit is in contact.

It has been shown that the ionization of the gases within the cylinder of a spark ignited engine exhibits a qualitative change of pattern when the engine is detonating from the pattern which exists when the engine is operating normally and without detonation. The detection of the occurrence of detonation by detecting these qualitative changes in the ionization pattern of the burning gases in the cylinders of an internal combustion engine has been proposed in the prior art, such a method of and apparatus for detonation detection being disclosed in the copending application of Thomas R. Harrison, Serial No. 661,203, dated April 11, 1946. The present invention relates to improved apparatus of the above type having certain desirable features such as increased sensitivity, positive indication of detonation, freedom from uncertain operation, and individual indication of conditions in each cylinder.

In an internal combustion engine, when the cylinder gases are ignited, they burn, and the accompanying ionization causes them to become electrically conductive. In a non-detonating cylinder, this ionization rises to a maximum at a comparatively rapid rate and then gradually diminishes during the power stroke of the engine. The ionization pattern thus produced comprises a series of relatively large fluctuations or surges of ionization, one surge for each firing of the cylinder, whose rate of occurrence is dependent upon the speed of operation of the engine.

When detonation takes place, it does so at a time shortly after the ionization has reached its maximum value, occurring therefore, while the ionization is decreasing. The occurrence of detonation is accompanied by the occurrence of a train of relatively low valued, high frequency, damped oscillations or fluctuations of ionization superimposed on the descending portion of the ionization fluctuation or surge caused by combustion. The ionization pattern thus produced comprises the same series of relatively large ionization fluctuations or surges caused by combustion, but in addition on the descending portions of these fluctuations there will be superimposed the relatively low valued, high frequency train of damped oscillations indicative of detonation. Thus upon the occurrence of detonation, a qualitative change takes place in the ionization pattern.

In the present invention, the changes in conductivity of the cylinder gases which result from changes in ionization of the latter cause corresponding changes in an electrical current which is caused to flow between a pair of electrodes located in the cylinder. This varying current is fed into a discriminating and amplifying circuit, wherein the effects of the surges of current caused by the above mentioned ionization surges are suppressed. However, the relatively high frequency damped oscillations or fluctuations of the current, caused by the fluctuations of ionization accompanying detonation, are not suppressed, but are separated from the signal resulting from the suppressed surges of combustion and are amplified and caused to actuate an indicating device, such as an incandescent lamp, thereby providing an indication of the occurrence of detonation, or of the occurrence of an intensity of detonation exceeding a predetermined desired value.

When a detonation detector of the type described above is operatively connected to an internal combustion engine, the engine operator can decrease the fuel-to-air ratio of the combustible mixture supplied to the engine until the detonation indicator signals that a further reduction in this ratio will cause an undesirable intensity of detonation to occur. This permits the engine to be operated with a minimum fuel consumption rate, without the danger of serious detonation occurring. Moreover, a control means can be incorporated with the detonation indicating device whereby the fuel-to-air ratio will automatically be set to and maintained at the optimum value of minimum rate of fuel consumption for a desired slight intensity of detonation.

Since the present invention requires the installation in one or more of the cylinders of only a substantially rugged, simple ionization-gap plug, it is suitable for use with aircraft engines where simplicity of installation, minimum maintenance, positive indication, and dependable operation are prime requisites. Further, the present invention is insensitive to extraneous vibrations, and, therefore, is not affected in its operation by such disturbances.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Of the drawings:

Fig. 1 is a diagram of the circuit of a preferred embodiment of the present invention;

Fig. 2 is a curve of ionization gap current vs. time for normal burning of the cylinder gases;

Fig. 3 is a curve of ionization gap current vs. time for burning of the cylinder gases accompanied by detonation;

Fig. 4 is a circuit diagram of a modification of a portion of the circuit of Fig. 1;

Fig. 5 is a circuit diagram of a discriminator which may be used in place of the first two stages of amplification in the circuit of Fig. 1;

Figs. 6–10 are circuit diagrams of various modifications of the circuit of Fig. 1;

Fig. 12 is a circuit diagram of a system in which the engine spark plugs are utilized as ionization gaps.

Figure 11:
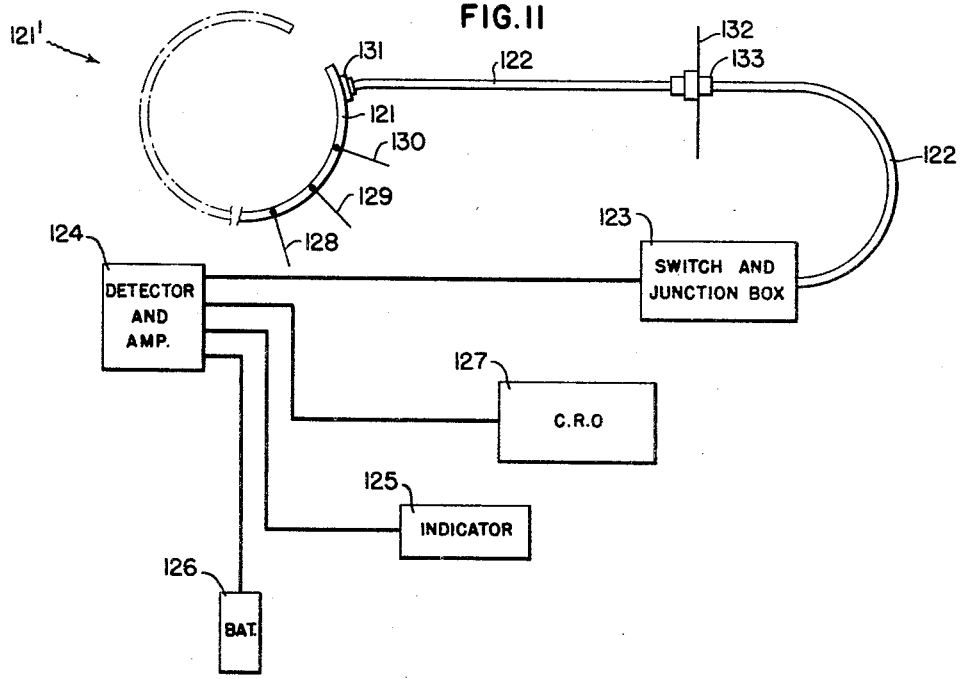
Fig. 11 is a diagram of the connections between the various units comprising the detonation detection system.

In Fig. 1 is shown the circuit diagram of a complete detonation detecting system which I now regard as the preferred embodiment of the present invention. In this figure, the reference numeral 1 generally designates one of the cylinders of a multicylinder, spark ignited, internal combustion engine, such as an aircraft engine. A spark plug 2 is mounted in the cylinder in the usual manner, and an ionization plug 3 is also mounted in the cylinder 1. This ionization plug has a centrally located electrode 4 which is insulated from the body of the plug and which extends into the chamber of cylinder 1. The electrode 4 together with the internal wall surface 5 of the cylinder 1 forms an ionization gap 6 within the cylinder. The surface 5 of the gap is connected to ground through the cylinder wall and the frame of the engine, as shown at G. The electrode 4 is connected to the insulated conductor 7 of a shielded cable 8 by a similarly shielded conductor 9. The remainder of the cylinders of the engine, not shown, are equipped with similar ionization gaps, such as those shown at 10 and 11. The electrodes of all of these gaps are connected to the conductor 7 of the cable 8, and the internal surfaces of the cylinder walls forming the other sides of the ionization gaps are grounded at G through the cylinder walls and engine frame. A shield 12, surrounding the conductor 7, is grounded by being connected to each cylinder head by a respective one of a plurality of conductors such as 13, 14 and 15.

At 16 is shown the circuit for the detonation detector, comprising a discriminating and amplifying circuit portion 17 and an indicating circuit portion 18. The discriminating and amplifying circuit portion 17 comprises three stages of amplification, employing vacuum tubes 19, 20, and 21, and various other circuit components to be hereinafter described. The indicating circuit portion 18 comprises a relay 22 and indicating lamps 23 and 24. A battery 25 is used as a source of energy for the detonation detection system, and may well be the 24 volt battery used to supply energy to the rest of the aircraft equipment, when the detector is installed in an airplane. However, in the absence of such a battery, an energizing circuit for supplying a direct current potential to the detection system from a source of alternating current potential may be employed.

The vacuum tubes 19 and 20 are of the pentode type, such as the type 14H7, each tube having a plate, a suppressor grid, a screen grid, a control grid, a cathode, and a heater. The tube 21 is of the twin pentode type, such as the type 28D7, consisting of two pentode sections in a single envelope. Each section comprises a separate plate, a suppressor grid, a screen grid, a control grid, a cathode, and a heater.

The relay 22 of the indicating circuit 18 has an operating coil 26, a movable contact member 27, and stationary contact members 28 and 29, so arranged that when the coil 26 is de-energized, the member 27 contacts the member 29, and when the coil 26 is energized, the member 27 contacts the member 28.

The insulated conductor 7 of the cable 8 is connected into the circuit 17 through a filtering resistance 30, one end of the latter being connected to the conductor 7, and the other end being connected through a coupling condenser 31 to the control grid of the tube 19. This latter end of the resistance 30 is also connected to a positive bus 32 through a filter inductance 33, and to a ground bus 34 through a filter condenser 35. The positive bus 32 is connected to the positive terminal of the battery 25, and the ground bus 34 is connected to the negative terminal of the battery 25. A filter condenser 36 is connected in parallel with the inductance 33, and a resistance 37 is connected between the positive bus 32 and the ground bus 34. The ground bus 34 is connected to ground through a conductor 38 and the shield 12 of the cable 8, this shield being grounded as explained hereinbefore. The control grid of the tube 19 is connected to the ground bus 34 through a grid resistance 39, and the chassis of the detector is connected to the bus 34 at a connection G'.

The cathode, suppressor grid, and one terminal of the heater, all of the tube 19, are connected to the ground bus 34. The other terminal of this heater is connected to one terminal of the heater of the tube 20, the other terminal of the latter heater being connected to the positive bus 32. Thus the heaters of the tubes 19 and 20 are connected in series between the positive bus 32 and the ground bus 34.

The screen grid of the tube 19 is connected to the positive bus 32 through a screen grid resistance 40, and to the negative bus 34 through a by-pass condenser 41. The plate of the tube 19 is connected to the positive bus 32 through a plate load resistance 42, and to the control grid of the tube 20 through a coupling condenser 43 and a variable grid resistance 44. The latter has one end connected to the grid side of the coupling condenser 43, and has its slider connected to the control grid of the tube 20. The other end of the resistance 44 is connected to the ground bus 34, as are the cathode and suppressor grid of the tube 20.

The screen grid of the tube 20 is connected to the positive bus 32 through a screen grid resistance 45, and to the negative bus 34 through a by-pass condenser 46. The plate of the tube 20 is connected to the positive bus 32 through a plate load resistance 47, and to both of the control grids of the twin tube 21 through a coupling condenser 48. These control grids are connected to the ground bus 34 through a grid resistance 49.

The screen grids of the tube 21 are connected to the positive bus 32 through a screen grid resistance 50, and to the negative bus 34 through a by-pass condenser 51. The cathodes of the tube 21 are connected to the ground bus 34, and the suppressor grids of this tube are internally connected to the cathodes. The plates of the tube 21 are connected to the positive bus 32 through the coil 26 of the relay 22. The heaters of the tube 21 are connected in series between the busses 32 and 34.

The contact member 27 of the relay 22 is connected to the positive bus 32, the member 29 is connected to one terminal of the indicating lamp 24, and the member 28 is connected through a voltage dropping resistance 52 to one terminal of the indicating lamp 23. The remaining terminals of the lamps 23 and 24 are connected to the ground bus 34.

With reference to the curve of Fig. 2 which shows ionization gap current for the cylinder 1 plotted as a function of time for the normal, non-detonating combustion period of the cycle of operation of the engine being tested, the portion 53 of the curve covers a part of the period of time in the operating cycle of the engine during which no combustion and hence no changes in ionization are taking place in the vicinity of the ionization gap 6. During this period, there is practically an infinite resistance between the respective electrodes of all of the ionization gaps, and the current in the gap circuit is, therefore, zero, as shown. Under this condition, the tubes 19, 20, and 21 are sufficiently conductive to cause a current to flow through the relay coil 26 of such a magnitude as to energize this coil and thereby cause the contact members 27 and 28 to be in contact. With the relay contacts in this relative position, the indicator lamp 23 is connected through the resistance 52 across the battery 25 and is thereby caused to light, indicating that the device is in operation.

At some time before the time indicated by the point 54 on the curve of Fig. 2, the spark plug 2 in the cylinder 1 has fired, igniting the combustible mixture within the cylinder. As the cylinder gases burn, they undergo a rapid change in ionization, and this increasing ionization increases their conductivity. At the time indicated by the point 54, the burning gases have reached the electrodes of the ionization gap 6 located in the cylinder 1 in which the burning is taking place. This results in a surge of current in the gap circuit as shown by the portion 55 of the curve of Fig. 2. This current flowing through the inductance 33 produces a voltage drop across the latter which drives the control grid of the tube 19 negative with respect to its associated cathode, thereby causing the tube 19 to become non-conductive. The values of the condenser 31 and the resistance 39 are chosen so as to permit the control grid of the tube 19 to follow the negative swing of the gap circuit. This results in a decrease in the plate current which normally flows through the plate load resistance 42, thereby causing an increase in the positive potential between the plate of the tube 19 and ground. This positive swing of the plate of the tube 19 tends to swing the control grid of the tube 20 positive with respect to its associated cathode. However, the control grid of the tube 20 is prevented from swinging more than slightly positive by the action of grid rectification in the tube 20, which causes an electron flow between cathode and control grid when the latter tends to become positive, thereby maintaining the control grid at a constant potential relative to its cathode. The values of the condenser 43 and the resistance 44 are so chosen as to permit the control grid of the tube 20 to be held at a constant, slightly positive potential while the plate of the tube 19 swings considerably more positive.

The slight positive swing of the control grid of the tube 20 causes its associated plate to swing slightly in a negative direction with respect to ground which results in the control grids of the tube 21 being driven slightly negative. However, this slight negative swing of the control grids does not cause a decrease in the plate current of the tube 21 sufficient to produce de-energization of the relay 22. Since the relay 22 remains energized, the indicator lamp 23 remains lighted, indicating normal operation of the engine and the indicator.

At the point 56 on the curve of Fig. 2, the ionization and hence the ionization gap current are at a maximum. From this point, the ionization and the gap current decrease at a relatively slow rate, following the portion 57 of the curve. As the current through the inductance 33 decreases, the control grid of the tube 19 returns towards its original slightly negative potential, thereby unblocking the tube 19 and allowing plate current to flow therethrough once more. This increase in plate current swings the plate of the tube 19 in a negative direction with respect to ground, which in turn swings the control grid of the tube 20 negative with respect to its cathode. The resulting positive swing with respect to ground of the plate of the tube 20 tends to swing the control grids of the tube 21 positive with respect to their associated cathodes. However, these grids are prevented from swinging more than slightly positive by the action of grid rectification in the tube 21, which operates in the same manner as described for the tube 20. The values of the condenser 48 and the resistance 49 are chosen so as to allow the control grids of the tube 21 to be held at a constant value while the plate of the tube 20 swings in a positive direction with respect to ground. Since the control grids of the tube 21 are swung in a positive direction, the relay 22 remains energized, the indicator lamp 23 remains lighted, and normal operation of the engine and the detonation detector is thereby indicated.

At the point 58 of the curve of Fig. 2, the ionization and the gap current have returned to their initial zero value, the control grids of the tubes 19, 20 and 21 are at their original, slightly negative potentials, the plate currents of these tubes are at their original values, and the indicator lamp 23 remains lighted.

When detonation occurs, it does so at a time slightly after the ionization and hence the ionization gap currents have reached their maximum values. The occurrence of detonation is accompanied by the occurrence of a train of relatively high frequency, low valued, damped oscillations or fluctuations in ionization and gap current, these fluctuations being superimposed on the descending portion of the ionization gap current curve. In Fig. 3 is shown by way of example a typical ionization gap current curve for a detonating cylinder. The portions 59, 60, and 62 of the curve of Fig. 3 correspond, respectively, to the portions 53, 55, and 56 of the curve of Fig. 2. In Fig. 3, however, the train of oscillations or fluctuations representative of detonation are shown by the curve portion 61. These fluctuations in gap current cause a fluctuating potential to be applied to the control grid of the tube 19, since the values of the condenser 31 and the resistance 39 are such as to allow the control grid of the tube 19 to follow the potential swings of the gap circuit. The fluctuations on the control grid of the tube 19 are amplified by the latter, and the resulting signal is impressed on the control grid of the tube 20, causing this control grid to fluctuate in potential relative to its associated cathode. These fluctuations of the control grid are maintained below zero control grid potential by the action of grid rectification, which charges the condenser 43 and thereby lowers the average potential of the control grid with respect to its cathode.

The fluctuations in control grid potential of the tube 20 just described are amplified by this tube and applied to the control grids of the tube 21. In response to these fluctuations, the control grids of the tube 21 are driven considerably negative with respect to their associated cathodes, but are prevented from being driven more than slightly positive by the action of grid rectification as explained hereinbefore. The reduction in the average plate current of the tube 21 resulting from these negative swings of the control grids is sufficient to cause deenergization of the relay 22, thereby causing the indicator lamp 23 to be extinguished and the warning lamp 24 to be lighted, thus indicating the occurrence of detonation.

By the time that the gap current has reached the point 63 on the curve of Fig. 3, the detonation fluctuations have disappeared, the ionization and the gap current have returned to their initial zero values, the normal plate currents are flowing in the tubes 19, 20 and 21, the relay coil 26 is once again energized, the warning lamp 24 is extinguished, and the indicator lamp 23 is again lighted. The warning lamp 24 is caused to give a brighter light than the indicator lamp 23 by means of the voltage dropping resistance 52 in the circuit of the indicating lamp 23. Thus the warning lamp 24 attracts more attention than the indicator lamp 23. If desired, the warning lamp 24 may be provided with suitable coloring means so that a red light is flashed upon the occurrence of detonation, while the indicator lamp 23 may be provided with coloring means to give a green light when normal operation with no detonation is had.

The intensity of detonation at which the warning lamp 24 is caused to flash is determined by the position of the slider on the grid resistance 44. By adjusting this slider on the resistance 44, the amplitude of the signals fed to the second and third amplification stages is controlled. Thus the detector can be set at any desired operating value, and the warning lamp caused to flash when the desired allowable intensity of detonation is reached or exceeded.

In the circuit of Fig. 1 the values of the inductance 33, and the condensers 35 and 36 are so chosen that the resonant frequency of the resulting L-C circuit coincides with the average frequency of the fluctuating signal which accompanies detonation, thus making the input circuit most sensitive to these detonation fluctuations, and thereby providing increased discrimination against the effects of the ionization surges of combustion and at the same time amplifying the effects of the high frequency detonation signal.

The filtering action of the resistance 30 in conjunction with the capacitance existing between the grounded shield 12 and the conductor 7 of the cable 8 results in an attenuation of any stray signals which tend to be picked-up in the input circuit of the detonation detector, thus preventing such signals from causing improper operation of the indicator.

In Fig. 4 is shown the circuit diagram for a modification of the input circuit of Fig. 1. In Fig. 4, the input circuit consists of the capacitance between the conductor 7 and the shield 12 of the cable 8, a filter condenser 64, a filter resistance 65, the coupling condenser 31 and the grid resistance 39. A resistance 66 provides exciting voltage for the ionization gap 6, replacing the inductance 33 of Fig. 1. The pentode vacuum tube 19 of the latter figure is replaced in the circuit of Fig. 4 by a triode 19A such as the type 14A4, which is provided with cathode bias by a cathode resistance 67 and a cathode by-pass condenser 68 connected in parallel with each other between the cathode of the tube 19A and the ground bus 34.

The values of the components of the circuit of Fig. 4 are so chosen as to cause the relatively low frequency signal caused by the cyclic occurrence of the ionization surges of combustion to be attenuated, and to cause the relatively high frequency signal accompanying detonation to be passed, amplified, and used to actuate the warning lamp, the condensers 64 and 31 and the resistances 65 and 39 forming a high-pass filter network. The remainder of the circuit operates in the same manner as described in connection with the circuit of Fig. 1.

In Fig. 5 is shown a discriminating and amplifying circuit which may be substituted for the input and first two stages of the circuit of Fig. 1, being used to deliver a signal to the output stage of the latter. The circuit of Fig. 5 comprises 4 triode vacuum tubes, 69, 70, 71, 72. The triodes 69 and 70 may be contained in the same envelope of a twin triode tube, such as the type 14F7, and the triodes 71 and 72 may be contained in the same envelope of another 14F7 twin triode tube. Each triode comprises a plate, a control grid, a cathode, and a heater. The heaters are supplied with exciting voltage by a suitable means, not shown.

The tubes 69, 70, 71, and 72 are provided with cathode bias by having their respective cathodes connected to the ground bus 34 through cathode resistances 73, 74, 75, and 76, respectively. Cathode by-pass condensers 77, 78, 79 and 80 are connected in parallel with the resistances 73, 74, 75, and 76, respectively. The electrode 4 of the ionization gap 6 is connected to the positive voltage bus 32 through the resistance 66 and to the grid of the tube 69 through the coupling condenser 31 and a variable grid resistance 81. One end of the resistance 81 is connected to the grid side of the coupling condenser 31, and the other end of the resistance 81 is connected to the ground bus 34. The slider on the resistance 81 is connected to the grid of the tube 69. The plate of the latter tube is connected to the positive bus 32 through a plate load resistance 82, and to the grid of the tube 70 through a coupling condenser 83. The grid of the tube 70 is also connected to the grid of the tube 71 through the variable grid resistance 84. One end of this resistance is connected to the junction between the condenser 83 and the grid of the tube 70, and the other end is connected to the ground bus 34. The slider of the resistance 84 is connected to the grid of the tube 71.

The plate of the tube 70 is connected to the positive bus 32 through a plate load resistance 85, and to the grids of the final amplifier tube 21 of Fig. 1, not shown in Fig. 5, through a coupling condenser 86.

The plate of the tube 71 is connected to the positive bus 32 through a plate load resistance 87 and to the grid of the tube 72 through a coupling condenser 88. This grid is also connected to the ground bus 34 through a grid resistance 89. A condenser 90 and an impedance 91 are connected in series between the plate of the tube 71 and the ground bus 34 for a purpose to be hereinafter described. The plate of the tube 72 is connected to the plate of the tube 70.

The triodes 69 and 70, together with their associated components, form a two stage voltage amplifier between the ionization gap and the output stage. Similarly, the triodes 69, 71 and 72 and their associated components form a three stage voltage amplifier between the gap and the output stage. The plate of the tube 71, which is in the second stage of amplification of the second amplifying channel, has connected between it and ground the series resonant circuit comprising the impedance 91 and the condenser 90. These two components have their values so chosen that the circuit is tuned to resonate at the mean frequency of the oscillations which accompany detonation.

The circuit of Fig. 5 provides narrow bandpass filtering action free from shock-excited responses. In operation, the steep wave front signal caused by the ionization surges of combustion is partially suppressed by the condenser 31, and the resulting signal is fed into the tube 69, wherein it is amplified and then fed into the tube 70. The signal is further amplified by the latter, and the resulting amplified signal appears across the plate load resistance 85. A portion of the output signal of the tube 69 is also fed into the tube 71, the amount so fed being dependent on the setting of the resistance 84. The amplified output signal of the tube 71 is fed into the tube 72, where it is further amplified and impressed across the plate load resistance 85. Since the first amplifying channel contains two stages, comprising the tubes 69 and 70, the signal from this channel developed across the resistance 85 will be in phase with the input signal to the tube 69, whereas since the second amplifying channel contains three stages, comprising the tubes 69, 71 and 72, the signal from this channel developed across the resistance 85 will be 180 degrees out of phase with the input signal to the tube 69. Thus the two signals developed across the resistance 85 will be 180° out of phase with respect to one another, hence the resistance 84 can be adjusted so that these two signals across the resistance 85 cancel each other, and cause no signal to be impressed on the output stage through the condenser 86. Thus the low frequency signal of normal combustion produces no excitation of the output stage or indicator.

When detonation occurs, the usual high frequency signal accompanies it. This signal is amplified by the first channel, and the amplified signal appears across the resistance 85. In the second channel, however, the series circuit of the impedance 91 and the condenser 90 becomes resonant, providing a low impedance path between the plate of the tube 71 and ground. The high frequency signal follows this path to ground, and therefore practically none of the signal appears across the resistance 85. Since there is no out of phase signal present to cancel it, the high frequency signal across the resistance 85 from the first channel is impressed on the output stage, wherein it causes de-energization of the relay and causes the warning lamp to flash, indicating the occurrence of detonation. The resistance 81 can be adjusted to determine the intensity of detonation at which the device will flash a warning.

The circuit of Fig. 6 is that of another modification of the input and first stage of the circuit of Fig. 1, wherein the pentode 19 of Fig. 1 is replaced by a triode 19A, such as the type 14A4, as in the circuit of Fig. 4. The input circuit of Fig. 6 comprises the coupling condenser 31, which couples the electrode 4 of the ionization gap 6 to the grid of the tube 19A; the grid resistance 39 connected between the grid of the tube 19A and the ground bus 34; the resistance 66, replacing the inductance 33 of Fig. 1 and supplying voltage to the gap 6; and the capacity between the shield 12 and the conductor 7 of the cable 8.

An impedance 92 and a resistance 93 are connected in series with each other between the cathode of the tube 19A and the ground bus 34. A condenser 94 is connected in parallel with the impedance 92, and a condenser 95 is connected in parallel with the resistance 93. A coupling condenser 96 couples the cathode of the tube 19A to the grid of the tube 20 of Fig. 1, not shown in Fig. 6.

This circuit of Fig. 6 provides band pass filtering of the input signal from the ionization gaps. The values of the circuit constants are so chosen that a minimum response to the initial surge of gap current, shown by the portions 55 and 60 of the curves of Fig. 2 and Fig. 3, respectively, is obtained, while maximum response to the returning portions 57 and 61 of the curves of Fig. 2 and Fig. 3, respectively, is had. Proper choice of component values also results in a band pass filter action which functions in the same manner as the input L–C circuit of Fig. 1 to increase the effectiveness of the relatively high frequency signal which accompanies detonation in actuating the warning indicator. The low response to the rising portion of the combustion curve minimizes the initial shock to the tuned circuit, whereas the high response to the descending portion of the curve enables the presence of the high frequency superimposed signals to be detected when detonation occurs.

Since the circuit of Fig. 6 is of the cathode follower type, there is no 180° phase shift between the grid and output signals, and the effects of the initial surge of ionization current of combustion are therefore suppressed by grid rectification in the tube 21, instead of in the tube 20. Further, the effects of the downward surge of ionization current due to decreasing ionization are suppressed by grid rectification in the tube 20 instead of in the tube 21. Aside from these differences resulting from the absence of a 180° phase shift in the first stage, the circuit of Fig. 6 functions in the same manner as the circuit of Fig. 1, when connected to the indicated portion of the latter as explained hereinbefore.

In Fig. 7 is shown the circuit of another modification of the input and first stages of the circuit of Fig. 1, which is similar to the circuit of the modification of Fig. 6. In the input stage of Fig. 7, the electrode 4 of the gap 6 is connected to the grid of the tube 19A through the coupling condenser 31. The resistance 66 connected between the electrode 4 and the positive bus 32 supplies voltage to the gap 6. A grid resistance 97 is connected between the grid and the cathode of the tube 19A, and the plate of the latter is directly connected to the positive bus 32. The cathode of the tube 19A is connected to the ground bus 34 through a resistance 98, and to a conductor 99 through a condenser 100. An impedance 101 and a condenser 102 are connected in parallel with each other between the conductor 99 and the ground bus 34. The conductor 99 is coupled through the condenser 96 to the grid of the tube 20 of the circuit of Fig. 1, not shown in Fig. 7.

As in the case of the circuit of Fig. 6, proper choice of the constants of the circuit of Fig. 7 causes the circuit to have a minimum response to the rising portion of the combustion curve, minimizing the initial shock to the tuned circuit, and to have a maximum response to the descending portion of the combustion curve, to enable the superimposed high frequency signal accompanying detonation to be detected and impressed on the remainder of the circuit for actuating the warning indicator. As in the circuit of Fig. 6, the circuit of Fig. 7 provides band-pass filtering of the ionization gap signal so that the relatively high frequencies which accompany detonation will be passed to the indicator circuit, and the effects of the combustion ionization surges will be partially suppressed.

The circuit of Fig. 8 is that of a modification of the indicator circuit 18 of Fig. 1. This circuit not only indicates the occurrence of an intensity of detonation exceeding any predetermined value, but also measures the frequency of occurrence of such detonation. The circuit comprises a gas triode tube 103, such as the type 884; a voltage regulator, gas discharge tube 104, such as the type VR–90; a current measuring device, such as a milliameter 105; a voltage measuring device, such as a voltmeter 106; and other circuit components to be hereinafter described. The gas triode 103 comprises a plate, a control grid, a cathode, and a heater, all in a sealed envelope containing a suitable gas. The heater is supplied with energizing voltage by a suitable means, not shown. The gas discharge, voltage regulator tube 104 comprises a plate and a cathode in a sealed envelope containing a suitable gas.

In Fig. 8 is shown a portion of the output amplifying tube 21 of Fig. 1. The connections to this tube not shown in Fig. 8 are the same as those shown in Fig. 1. In Fig. 8 the plates of the tube 21 are connected through a plate load resistance 107 to the positive bus 32. The screen grids of the tube 21 are connected to the positive bus 32 through the resistance 50 and to the ground bus 34 through the condenser 51. The plates of the tube 21 are also connected to the grid of the gas tube 103 through a coupling condenser 108 and a current limiting resistance 109, the latter two units being connected in series. A resistance 110 is connected between the junction between the resistance 109 and the condenser 108 and the slider of an adjustable resistance 111. One end of the latter is connected to the ground bus 34, and the opposite end is connected to the negative terminal of a source of direct voltage, not shown, by the conductor 112.

The cathode of the tube 103 is connected to the ground bus 34 through a series-parallel circuit of two parallel branches. One branch consists of a cathode resistance 113 and the milliammeter 105 in series, and the other branch consists of a resistance 114 and a condenser 115 in series.

The plate of the gas tube 103 is connected to the positive terminal of the source of direct voltage, mentioned above, through resistances 116 and 117, connected in series, and a conductor 118. The plate of the tube 103 is also connected to the ground bus 34 through a condenser 119. The plate of the voltage regulator tube 104 is connected to the junction between the resistances 116 and 117, the other end of the resistance 116 being connected to the plate of the tube 103, and the other end of the resistance 117 being connected to the conductor 118 and thereby to the positive terminal of the source of direct voltage. The cathode of the voltage regulator tube 104 is connected to the ground bus 34. A condenser 120 is connected between the ground bus 34 and the slider of the resistance 111, as is the voltmeter 106.

As was explained above with reference to the circuit of Fig. 1, the occurrence of detonation causes a signal to appear on the control grids of the tube 21 which swings these grids negative with respect to their associated cathodes. This then causes the current flowing through the plate load resistance 107 to drop in value, resulting in a reduction of the potential drop across this resistance. Such a reduction in potential drop produces a signal on the grid of the gas tube 103 which tends to swing this grid positive with respect to its cathode. The potential difference between the grid and cathode of the tube 103 when no signal is being received from the tube 21 depends on the position of the slider on the resistance 111, for a given, fixed value of supply voltage between the conductors 118 and 112. This potential difference is adjusted so as to keep the grid of the tube 103 sufficiently negative with respect to its cathode to prevent the tube 103 from firing when no signal is supplied from the tube 21. The value of the negative biasing voltage supplied to the grid of the tube 103 is indicated by the voltmeter 106.

The magnitude of the signal from the tube 21 which is necessary to swing the grid of the tube 103 sufficiently positive to cause the tube to fire depends on the magnitude of the supplied negative biasing voltage. Hence, the intensity of detonation at or above which the tube 103 will be caused to conduct is determined by the value of this bias voltage. The bias voltmeter 106 can, therefore, be calibrated to read directly in terms of intensity of detonation, which intensity if exceeded will cause firing of the tube 103.

When the tube 103 is in the normal, non-conductive state, no appreciable current flows in the plate-cathode circuit, and therefore no indication is given by the milliammeter 105. When the tube fires, due to its grid being swung sufficiently positive by a signal from the tube 21, current flows in the plate-cathode circuit of the tube 103, the value of this current being dependent on the constants of the circuit and independent of the grid voltage. Once the tube has fired the grid loses control. The grid resistance 109 limits to a safe value the grid current which tends to flow.

A portion of the plate current which flows as a result of the tube firing and becoming conductive passes through the milliammeter 105, causing the latter to give an indication. The remainder of the plate current flows through the condenser 115, until the latter is charged.

The plate current flowing through the load resistance 116 causes a voltage drop to be developed across the latter which reduces the potential of the plate of the tube 103 with respect to its cathode. This reduction in plate voltage is such as to cause the tube to stop conducting, reducing the plate current to zero. The length of time during which plate current flows from the instant of firing to that of extinction is dependent on the constants of the circuit, and is independent of the magnitude of the grid swing. The voltage regulator tube 104 operates to maintain the plate supply voltage constant while the load varies. A tendency for the voltage across the tube 104 to increase above the desired operating value causes the tube to conduct sufficient current to produce across the resistance 117 a potential drop which overcomes the tendency of the voltage across the tube 104 to increase. Similarly, a tendency for a decrease in the voltage across the tube 104 results in operation of the circuit to cause a reduction in the drop across the resistance 117 and a consequent stabilization of the voltage across the tube 104.

When the plate current of the tube 103 drops to zero, the condenser 115 discharges through the milliammeter 105, causing the latter to give an indication for a period after the plate current has ceased to flow. With successive positive swings of the grid causing a pulsating plate current to flow, the condenser 115 acts to cause the milliammeter 105 to indicate an average plate circuit current resulting from such grid swings, the value of this average current being a function of the frequency of occurrence of the grid swings. Since the grid swings producing plate current are a result of detonation, the milliammeter 105 can be calibrated to read directly in terms of frequency of occurrence of detonation. This is possible since the magnitude of the plate current of the tube 103 is independent of the intensity of detonation and depends only on the frequency of its occurrence, whereas the intensity of detonation which will cause a flow of the plate current is determined by the bias voltage applied to the grid of the tube 103. The constants of the circuit can be so chosen as to cause a reading of the milliammeter 105 to be obtainable over the desired range of frequency of occurrence of detonation. Likewise, proper choice of constants will cause a reading of the voltmeter 106 to be obtainable over the desired range of intensity of detonation within which the device is to operate.

Summarizing the above, the milliammeter 105 is caused to give a reading of the frequency of occurrence of detonation having an intensity equal to or greater than a desired intensity, this latter being determined by the setting of the resistance 111 and indicated by the voltmeter 106.

In Fig. 9 is shown the circuit of another modification of the input portion of the circuit of Fig. 1. The circuit of Fig. 9 differs from that of Fig. 1 in that the pentode 19 of Fig. 1 is replaced in Fig. 9 by the triode 19A, and that in the latter figure, the filter resistances 30 and 37 and the condenser 36 are eliminated.

The circuit of Fig. 10 is still another modification of the input portion of the circuit of Fig. 1, and is similar to the modification shown in Fig. 9. In Fig. 10, the reactance 33 of Fig. 1 is replaced by the resistance 66, and the resistances 30 and 37 and the condensers 35 and 36 are omitted. The pentode 19 of Fig. 1 is replaced in Fig. 10 by the triode 19A.

The diagram of Fig. 11 gives in more or less pictorial form the connections between the various units which comprise a system for detonation detection to be used with a multi-cylinder engine such as an aircraft engine. The arrangement as shown in Fig. 11 is designed for a radial aircraft engine, and provides a suitable means to be described below whereby, upon the occurrence of detonation, a suitable signal is given, and if desired, the engine operator can readily ascertain in which cylinder or cylinders the detonation is occurring.

The system of Fig. 11 comprises a shielded, multi-conductor, ionization gap-connecting harness 121', a shielded harness cable 121, a shielded, multi-conductor connecting cable 122, a junction and selector switch box 123, a detecting, discriminating, and amplifying unit 124, an indicating unit 125, and a source of operating voltage, such as a battery 126. A cathode ray oscillograph 127 may be connected to the amplifying unit 124 to permit visual analysis of the ionization patterns if desired. The battery 126 may be the regular battery used to supply voltage to the other aircraft equipment.

The harness cable 121 has extending from it a plurality of leads 128, 129, 130, etc., there being a properly positioned lead for connection to the electrode of the ionization gap in each cylinder of the engine. These leads continue within the harness cable as separate, insulated conductors, and are connected to respective conductors of the multi-conductor shielded cable 122 by the connector assembly 131. The cable 122 continues from the harness 121 through the fire wall 132 of the plane, the cable passing through a connector assembly 133. The cable 122 terminates at the junction and selector switch box 123, the latter being provided with a plurality of switches, one for each cylinder, by means of which the ionization gaps in any of the cylinders, or in any number of the cylinders, can be selectively connected to the input of the detonation detector. A check of the operation within any particular cylinder or cylinders can be had by closing the corresponding switch or switches.

The junction and selector switch box 123 is connected by a single conductor shielded cable to the detector unit 124, which may be any of the various units whose circuits have been shown and described hereinbefore. The battery 126, or other voltage source, is connected to the unit 124 by a suitable two conductor cable, as is the cathode ray oscillograph 127, if one is used.

The indicating unit 125 contains the indicating lamps of Fig. 1 or meters of Fig. 8 for showing normal or detonating operation, and may contain a power switch and fuse for the detonation system. It is shown connected to the unit 124 by a suitable five conductor cable.

In operation, the burning of the lamp indicating normal engine operation gives a continuous check on the operation of the detonation detecting system. With all of the selector switches closed, the engine operator can reduce the fuel-to-air ratio of the combustible mixture supplied to the engine until the normal operation lamp is extinguished and the warning lamp flashes to indicate that a certain predetermined allowable intensity of detonation has been reached. If he desires to do so, the operator can then open various of the selector switches and thereby ascertain in which cylinder or cylinders the detonation is occurring. This procedure is especially desirable when the aircraft is being operated on the ground for engine adjustment purposes, or it may be employed in flight to determine which cylinders need adjustments to be made later. In general flight operation, however, all of the selector switches may be left closed, and once the warning lamp has flashed, the fuel-to-air ratio may be raised slightly to just cause the warning lamp to remain extinguished and the normal operation lamp to remain lighted. If detonation should occur subsequently, the latter lamp will be extinguished, and the warning lamp will flash. The operator can then, if desirable, ascertain which cylinder or cylinders are not operating normally, and can use this information for making future engine adjustments. For the time being, however, he can further increase the fuel-to-air ratio until the objectionable cylinder or cylinders no longer cause the detonation indicator to give a warning signal.

A system by means of which the regular spark plugs of an engine can be employed as ionization gaps for connection to a detonation detector system is shown in Fig. 12. The system as shown is for a four cylinder engine, but it is to be understood that the system will work equally well on an engine having any number of cylinders.

In Fig. 12 is shown an ignition distributor 134, which is of a type usually employed to supply the sparking voltage to the spark plugs at the proper time. A suitable mechanical linkage 135 causes the arm of the distributor 134 to rotate adjacent to its contacts in the usual manner, and the electrodes of the spark plugs 136, 137, 138, and 139 are connected to these distributor contacts by suitable means. The rotating contact arm of the distributor is connected to the spark transformer, not shown, in the usual way by a conductor 139'.

An actuating device 140 comprises two sections 141 and 142, each of which consists of a rotating contact arm and four stationary contacts, all insulated from each other. These sections are each similar to the distributor 134 except that the former have contact arms which make successive contact with each of the stationary contacts, while in the latter, the arm usually merely moves successively adjacent to its stationary contacts, but does not touch them.

The rotating contact arms of the actuator sections 141 and 142 are driven at the same speed as the arm of the distributor 134 by a suitable means 143, connected to the linkage 135, and from which the arms are insulated electrically. The respective contacts of the actuator sections are connected together and are connected through resistances 144, 145, 146, and 147 respectively, to the electrodes of the spark plugs 136, 137, 138 and 139, respectively. The arm of the actuator section 141 is connected to ground, and the arm of the actuator section 142 is connected to the conductor 7 of the cable 8 by which it is connected to the input of the detector circuit as previously shown. A condenser 148 is connected between the conductor 7 and ground for minimizing the effects due to transient voltages.

The contact arms of the units 134, 141 and 142 are so adjusted relative to one another that when the distributor arm is causing voltage to be delivered to the spark plug 136, the arm of the actuator section 141 causes the resistance 144 connected to the sparking plug 136 to be grounded. At the same time, the arm of the actuator section 142 is in position to connect the electrode of the spark plug 139 to the input of the detector through the resistance 147. As the engine cycle progresses, the distributor arm moves to the contact which causes the next spark plug 137 to fire, assuming counterclockwise rotation of the arm as shown, and at the same time, the resistance 145 connected to the sparking plug 137 is grounded by the arm of actuator section 141, and the spark plug 136 which has just fired is connected through its resistance 144 to the input of the detector by means of the rotating contact arm and elongated contact segment of the actuator section 142, assuming counterclockwise rotation of these arms as shown. Thus as each spark plug fires, its electrode is connected to ground through its respective resistance, and the spark plug which has just previously fired has its electrode connected through its respective resistance to the input of the detonation detector.

The connection of the electrode of the sparking plug to ground through its associated resistance limits to a negligible value the amount of stray voltage which tends to be induced into the detector system from the high voltage sparking circuit, while the connection across the input of the detonation detector of the spark plug which has just fired prepares the system for making measurements of the ionization of the burning gases between the electrodes of that spark plug. When a spark plug is connected across the detector input, its associated series resistance together with the condenser 148 form a filter network which attenuates interfering, induced, stray signals.

Figure 13:
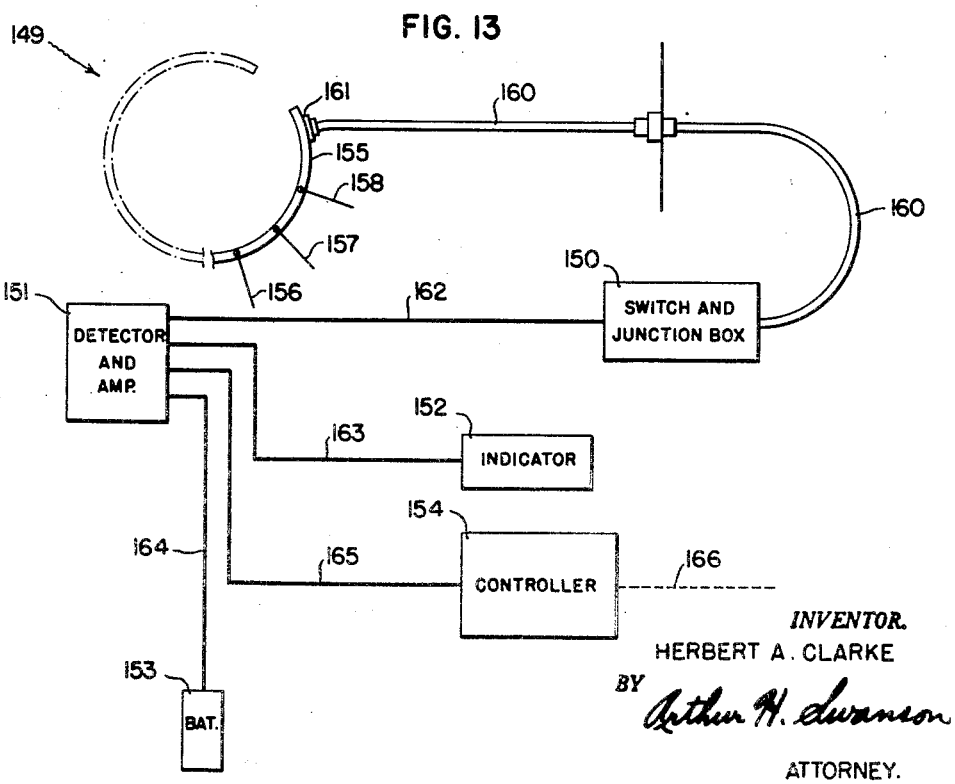
Fig. 13 is a diagram of the connections between the various units comprising the detonation detection and mixture control system.

The diagram of Fig. 13 is that of a particular embodiment of the present invention in which the detonation detector is combined with a suitable control means to afford automatic adjustment of the fuel-to-air ratio of the combustible mixture supplied to the cylinders of an internal combustion engine as a result of which adjustment the engine is caused to operate automatically on as low a fuel-to-air ratio as possible without the occurrence of detonation.

The connections between the units comprising an automatic mixture control system are shown in single line form in Fig. 13. Generally, the system may comprise a suitable ionization gap connection harness 149, designed for the particular engine which is to be equipped with the present device; a junction and selector switch box 150; a detonation detecting, discriminating, and amplifying unit 151; an indicating unit 152; a source of direct voltage for operating the system, such as a battery 153; and a control unit 154.

A harness cable 155 has extending from it at convenient places suitable leads 156, 157, 158, etc. for connection to the electrodes of the ionization gaps. There is an ionization gap, not shown, located in each cylinder of the engine to be equipped, and there is provided a separate lead to be connected to the electrode of each of these gaps. These leads continue in the harness cable 155 as separate, insulated conductors, the latter being connected to respective conductors in a multi-conductor connecting cable 160 by means of a connector assembly 161. The cable 160 continues to the junction and selector switch box 150, wherein the conductor from each gap is connected through a respective selector switch, not shown, to the cable 162 which connects the gap electrodes through their respective switches to the input of the detector unit 151. As for the system of Fig. 11 described hereinbefore, the selector switches in the box 150 enable the operator of the engine to ascertain in which cylinders detonation is occurring when making adjustments to the engine or the detonation detecting equipment. In actual operation, however, the apparatus does not permit greater than a desirable intensity of detonation to occur.

The indicating unit 152, connected to the detector unit 151 by a suitable cable 163, may contain the indicating lamp for normal operation and the warning lamp for system failure and detonation, as well as a power control switch for the detecting system.

The battery 153, which may be the main aircraft battery, is suitably connected to the detector and control units by the cable 164 for supplying necessary operating voltage to the system.

The control unit 154, connected to the detector by a cable 165, may comprise a reversible electric motor, having its field windings suitably connected through its armature to the contacts of the relay 22 and to the bus 34 of Fig. 1 in such a manner that de-energization of the relay due to the occurrence of detonation will effect operation of the motor in such a direction as to cause an adjustment to be made to the carburetor of the engine, not shown, through a suitable linkage 166, to increase the fuel-to-air ratio of the combustible mixture supplied to the engine and hence stop the detonation. The subsequent absence of detonation will then cause energization of the relay 22, which in turn is made to effect operation of the controller motor in the opposite direction to cause a decrease in the fuel-to-air ratio to be made. This will cause a slight intensity of detonation to occur, and the above cycle of adjustments will be repeated. Thus the engine will be operated on as lean a fuel mixture as possible with the occurrence of only a practically negligible intensity of detonation.

Subject matter disclosed but not specifically claimed herein is disclosed and claimed in the aforementioned copending Harrison application, Serial No. 661,203.

While, in accordance with the provisions of the statutes, I have illustrated and described the best forms of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. Apparatus for detecting detonation in an internal combustion engine, comprising a pair of spaced, electrically insulated electrodes adapted to be located in at least one of the cylinders of the engine and adapted, when so located, to be bridged by the burning gases of combustion therein, means adapted to be connected to a source of energizing voltage, said means including means for passing a unidirectional electrical current between each of said pairs of electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of the relatively slow increases and decreases of said electrical current which form surges of said current and which result from the ignition and burning of the gases bridging said pairs of electrodes and for detecting the occurrence of relatively rapid fluctuations in said electrical current which occur during the relatively slow decreases of said current as a result of detonation of the gases bridging said pairs of electrodes, and indicating means connected in the output circuit of said electronic amplifying means to indicate the occurrence of the detected fluctuations in said electrical current accompanying detonation of the burning gases in the cylinder.

2. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, and indicating means connected in the output circuit of said electronic amplifying means comprising an electromagnetic relay and a plurality of indicating lamps and adapted to indicate the occurrence of the detected fluctuations of said electrical current accompanying detonation of the burning gases in the cylinder.

3. Apparatus for detecting detonation in a cylinder of an internal combustion engine, comprising a pair of spaced, electrically insulated electrodes adapted to be located in the cylinder and connected in a circuit upon which a low unidirectional voltage is impressed to create an electrical current flow through the burning gases of combustion in the cylinder, electronic amplifying means arranged for direct energization by the low unidirectional voltage and having an input circuit including said electrodes and having an output circuit, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, and indicating means connected in the output circuit of said electronic amplifying means comprising an electromagnetic relay and a plurality of indicating lamps and adapted to indicate the occurrence of the detected fluctuations of said electrical current accompanying detonation of the burning gases in the cylinder.

4. Apparatus for detecting detonation in a cylinder of an internal combustion aircraft engine, comprising a pair of spaced, electrically insulated electrodes adapted to be located in the cylinder and connected in a circuit upon which is impressed a low unidirectional voltage from the aircraft storage battery system to create an electrical current flow through the burning gases of combustion in the cylinder, electronic amplifying means arranged for direct energization by the low unidirectional voltage of the aircraft storage battery system and having an input circuit including said electrodes and having an output circuit, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, and indicating means connected in the output circuit of said electronic amplifying means comprising an electromagnetic relay and a plurality of indicating lamps and adapted to indicate the occurrence of the detected fluctuations of said electrical current accompanying detonation of the burning gases in the cylinder.

5. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said discriminating means comprising means for providing an electrical signal operative within said discriminating means to effect cancellation of the electrical signal produced by the effects of the periodically recurring surges of said electrical current, and indicating means connected in the output circuit of said electronic amplifying means and adapted to indicate the occurrence of the detected fluctuations of said electrical current accompanying detonation of the burning gases in the cylinder.

6. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said discriminating means comprising a first amplifying channel adapted to amplify without appreciable change of phase the electrical signals produced within said electronic amplifying means by the periodically recurring surges of said electrical current and by the fluctuations of said current which accompany detonation of the burning gases in the cylinder, and a second amplifying channel adapted to amplify the electrical signal produced within said electronic amplifying means by the periodically recurring surges of said electrical current and to shift the phase of this signal through 180 degrees, but not to amplify the electrical signal produced within said electronic amplifying means by the fluctuations of said electrical current which accompany detonation of the burning gases in the cylinder, the amplified phase-inverted electrical signal of said second amplifying channel being operative within said discriminating means to effect cancellation of the amplified electrical signal of said first amplifying channel produced by the periodically recurring surges of said electrical current and thereby to suppress the effects of these surges of said electrical current, and indicating means connected in the output circuit of said electronic amplifying means and adapted to indicate the occurrence of the detected fluctuations of said electrical current accompanying detonation of the burning gases in the cylinder.

7. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electric current between said electrodes, electronic amplifying means having an input circuit including said electrodes and having an output circuit supplied with energizing voltage by the first mentioned means, said electronic amplifying means comprising a plurality of stages of amplification and including a first discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said first discriminating means comprising a plurality of electron tubes having resistive and capacitive means associated therewith and providing grid rectification for accomplishing suppression of the effects of the periodically recurring surges of said electrical current, and a second discriminating means operative to pass the detected electrical signal resulting from the fluctuations of said electrical current accompanying detonation of the gases in the cylinder but relatively insensitive to the electrical signal produced by the periodically recurring surges of said electrical current, said second discriminating means comprising at least one inductance-capacitance, high-pass filter network connected in the cathode circuit of an electron tube located in one of said stages of amplification, and indicating means connected in the output circuit of said electronic amplifying means to indicate the occurrence of the detected fluctuations of said electrical current accompanying detonation of the burning gases in the cylinder.

8. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including a first discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said first discriminating means comprising a plurality of electron tubes having resistive and capacitive means associated therewith and providing grid rectification for accomplishing suppression of the effects of the periodically recurring surges of said electrical current, and a second discriminating means operative to pass the detected electrical signal resulting from the fluctuations of said electrical current accompanying detonation of the gases in the cylinder but relatively insensitive to the electrical signal produced by the periodically recurring surges of said electrical current, said second discriminating means comprising at least one inductance-capacitance, high-pass filter network, and indicating means connected in the output circuit of said electronic amplifying means to indicate the occurrence of the detected fluctuations of said electrical current accompanying detonation of the burning gases in the cylinder.

9. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including a first discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said first discriminating means comprising a plurality of electron tubes having resistive and capacitive means associated therewith and providing grid rectification for accomplishing suppression of the effects of the periodically recurring surges of said electrical current, and a second discriminating means operative to pass the detected electrical signal resulting from the fluctuations of said electrical current accompanying detonation of the gases in the cylinder but relatively insensitive to the electrical signal produced by the periodically recurring surges of said electrical current, said second discriminating means comprising at least one resistance-capacitance, high-pass filter network, and indicating means connected in the output circuit of said electronic amplifying means to indicate the occurrence of the detected fluctuations of said electrical current accompanying detonation of the burning gases in the cylinder.

10. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said discriminating means comprising a plurality of electron tubes having resistive and capacitive means associated therewith and providing grid rectification for accomplishing suppression of the effects of the periodically recurring surges of said electrical current, and indicating means connected in the output circuit of said electronic amplifying means to indicate the occurrence of the detected fluctuations of said electrical current accompanying detonation of the burning gases in the cylinder.

11. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said discriminating means comprising means for providing an electrical signal operative within said discriminating means to effect cancellation of the electrical signal produced by the effects of the periodically recurring surges of said electrical current, and indicating means connected in the output circuit of said electronic amplifying means comprising an electromagnetic relay and a plurality of indicating lamps and adapted to indicate the occurrence of the detected fluctuations of said electrical current accompanying detonation of the burning gases in the cylinder.

12. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including a first discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, said first discriminating means comprising a plurality of electron tubes having resistive and capacitive means associated therewith and providing grid rectification for accomplishing suppression of the effects of the periodically recurring surges of said electrical current, and a second discriminating means operative to pass the detected electrical signal resulting from the fluctuations of said electrical current accompanying detonation of the gases in the cylinder but relatively insensitive to the electrical signal produced by the periodically recurring surges of said electrical current, said second discriminating means comprising at least one inductance-capacitance, high-pass filter network connected in the cathode circuit of an electron tube located in one of said stages of amplification, and indicating means connected in the output circuit of said electronic amplifying means comprising an electromagnetic relay and a plurality of indicating lamps and adapted to indicate the occurrence of the detected fluctuations of said electrical current accompanying detonation of the burning gases in the cylinder.

13. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, and integrating means connected in the output circuit of said electronic amplifying means and adapted to indicate the average frequency of occurrence of groups of the detected fluctuations of said electrical current accompanying detonation of the burning gases in the cylinder.

14. Apparatus for detecting detonation in a cylinder of an internal combustion engine, comprising a pair of spaced, electrically insulated electrodes adapted to be located in the cylinder and adapted, when so located, to be bridged by the burning gases of combustion therein, means adapted to be connected to a source of energizing voltage, said means including means for passing a unidirectional electrical current between said electrodes, electronic amplifying means having an input circuit including said electrodes and having an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinder, and integrating means connected in the output circuit of said electronic amplifying means and adapted to indicate the average frequency of occurrence of groups of the detected fluctuations of said electrical current accompanying detonation of the burning gases in the cylinder, said integrating means comprising capacitive means and means to cause said electronic amplifying means to deliver an electrical charge of a predetermined constant magnitude to said capacitive means upon each detection by said electronic amplifying means of the occurrence of a group of the fluctuations in said electrical current accompanying detonation of the burning gases in the cylinder, said capacitive means thereby having developed thereacross a varying potential, the magnitude of which is a function of the average frequency of occurrence of the detected groups of fluctuations of said electrical current accompanying detonation of the burning gases in the cylinder, and indicating means connected in circuit with said capacitive means for indicating the magnitude of said varying potential.

15. Apparatus for detecting detonation in an internal combustion engine, comprising a pair of spaced, electrically insulated electrodes in each cylinder of the engine adapted to be bridged by the burning gases of combustion therein, said pairs of electrodes comprising the sparking plugs normally provided in the engine cylinders to effect ignition of the combustible mixture supplied to the cylinders, means adapted to be connected to a source of energizing voltage, a first contacting means associated with the first mentioned means for passing a unidirectional electrical current between each of said pairs of electrodes at a predetermined time after that particular pair of electrodes has ignited the combustible mixture within its associated cylinder, electronic amplifying means having an input circuit and an output circuit supplied with energizing voltage by said first mentioned means, said first contacting means operating to include in said input circuit the particular pair of said electrodes which at that time has passing therebetween said unidirectional electrical current, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinders, a second contacting means associated with said first contacting means for causing a resistance to be shunted across each of said pairs of electrodes during the time that that particular pair of electrodes is igniting the combustible mixture within its associated cylinder, and indicating means connected in the output circuit of said electronic amplifying means and adapted to indicate the occurrence of the detected fluctuations of said unidirectional electrical current accompanying detonation of the burning gases in any of the engine cylinders.

16. Apparatus for detecting detonation in an internal combustion engine, comprising a pair of spaced, electrically insulated electrodes in each cylinder of the engine adapted to be bridged by the burning gases of combustion therein, said pairs of electrodes comprising the sparking plugs normally provided in the engine cylinders to effect ignition of the combustible mixture supplied to the cylinders, means adapted to be connected to a source of energizing voltage, a first contacting means associated with the first mentioned means for passing a unidirectional electrical current between each of said pairs of electrodes at a predetermined time after that particular pair of electrodes has ignited the combustible mixture within its associated cylinder, electronic amplifying means having an input circuit and an output circuit supplied with energizing voltage by said first mentioned means, said first contacting means operating to include in said input circuit the particular pair of said electrodes which at that time has passing therebetween said unidirectional electrical current, said electronic amplifying means comprising a plurality of stages of amplification and including means for detecting the occurrence of fluctuations of said unidirectional electrical current which accompany detonation of the burning gases in the engine cylinders, a second contacting means associated with said first contacting means for causing a resistance to be shunted across each of said pairs of electrodes during the time that that particular pair of electrodes is igniting the combustible mixture within its associated cylinder, and indicating means connected in the output circuit of said electronic amplifying means and adapted to indicate the occurrence of the detected fluctuations of said unidirectional electrical current accompanying detonation of the burning gases in any of the engine cylinders.

17. Apparatus for detecting detonation in at least two of the cylinders of an internal combustion engine, comprising a pair of spaced, electrically insulated electrodes associated with each of the engine cylinders in which detonation is to be detected, said electrodes being adapted to be bridged by the burning gases of combustion in the cylinders, means adapted to be connected to a source of energizing voltage, said means including means for passing a unidirectional electrical current between each of said pairs of electrodes, electronic amplifying means having an input circuit and an output circuit supplied with energizing voltage by the first mentioned means, said electronic amplifying means comprising a plurality of stages of amplification and including discriminating means for suppressing the effects of periodically recurring surges of said electrical current which occur upon the ignition of the cylinder gases and the consequent burning thereof and for detecting the occurrence of fluctuations of said electrical current which are superimposed upon the periodically recurring surges of said electrical current and which accompany detonation of the burning gases in the cylinders, manually operable selective switching means for including any number of said pairs of electrodes in the input circuit of said electronic amplifying means, and indicating means connected in the output circuit of said electronic amplifying means and adapted to indicate the occurrence of the detected fluctuations of said electrical current accompanying detonation of the burning gases in the particular cylinder or cylinders which have their associated pairs of electrodes included in said input circuit by said switching means.

18. Apparatus for detecting detonation in at least two of the cylinders of an internal combustion engine, comprising a pair of spaced, electrically insulated electrodes associated with each of the engine cylinders in which detonation is to be detected, said electrodes being adapted to be bridged by the burning gases of combustion in the cylinders, means adapted to be connected to a source of energizing voltage, said means including means for passing a unidirectional electrical current between each of said pairs of electrodes, electronic amplifying means having an input circuit and an output circuit supplied with energizing voltage by the first mentioned means, said electronic amplifying means comprising a plurality of stages of amplification and including means for detecting the occurrence of fluctuations of said electrical current which accompany detonation of the burning gases in the engine cylinders, manually operable selective switching means for including any number of said pairs of electrodes in the input circuit of said electronic amplifying means, and indicating means connected in the output circuit of said electronic amplifying means and adapted to indicate the occurrence of the detected fluctuations of said electrical current accompanying detonation of the burning gases in the particular cylinder or cylinders which have their associated pairs of electrodes included in said input circuit by said switching means.

HERBERT A. CLARKE.

REFERENCES CITED

The following references are of record in the file of this patent:

UNITED STATES PATENTS

| Number | Name | Date |
| --- | --- | --- |
| 2,075,774 | Allen | Mar. 30, 1937 |
| 2,220,558 | Van Dijck et al. | Nov. 5, 1940 |
| 2,395,902 | Nisewanger et al. | Mar. 5, 1946 |
| 2,401,563 | Hersey | June 4, 1946 |
| 2,407,652 | Costa | Sept. 17, 1946 |